United States Patent Office 3,352,837
Patented Nov. 14, 1967

3,352,837
SULPHUR-CONTAINING RESINOUS PRODUCTS AND THEIR PREPARATION
Jean-Baptiste Signouret, Billiere, France, assignor to Societe Nationale des Petroles d'Aquitaine, Paris, France
No Drawing. Filed July 14, 1965, Ser. No. 472,027
Claims priority, application France, July 23, 1964, 982,774
7 Claims. (Cl. 260—79)

ABSTRACT OF THE DISCLOSURE

Process for the preparation of sulphur-containing resinous condensation products, and such products which are soluble in molten sulphur and may be employed as plasticizers for such metalloid. The process involves the simultaneous reaction of a halo-epoxy alkane, hydrogen sulphide, and an alkali metal or alkaline earth metal polysulphide.

---

This invention relates to novel kinds of sulphur-containing resinous products and to a process for the manufacture thereof. The invention relates more particularly to the resinous compounds resulting from the condensation of halo-epoxy-alkanes with metal polysulphides, and to plastic compositions containing such compounds.

It is known to prepare condensation products of monohalogenated derivatives of aliphatic epoxides with alkali metals or alkaline earth metal sulphides or polysulphides. The production of condensates of this kind is disclosed by several patent specifications including French patent specifications 677,431 and 966,389. These prior art products are oily or pasty or solid, may or may not be soluble in various organic solvents, usually have a molecular weight above 3,000 and are not soluble in molten sulphur. This insolubility in sulphur is also found with the compound:

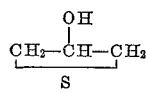

described by Sjoberg (C.A. 33, 2106–8°) and with:

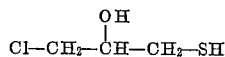

On the contrary, the novel products according to the invention arising from the condensation of halo-epoxy-alkanes with metal polysulphides have molecular weights not in excess of 3,000 and are soluble in liquid sulphur. Because of these special features, the resinous products according to the invention are useful in the preparation of some plastic compositions, more particularly the plasticization of sulphur, by being added to this metalloid.

The novel features just described are achieved by means of a condensation process which has various features differentiating it considerably from the known methods, more particularly a H₂S concentration not lower than a certain minimum value in the reaction medium and an appropriately limited proportion of halo-epoxy-alkane relative to the polysulphide present. The novel process comprises other preferred conditions which will be set forth hereinafter.

In the process according to the invention, a halo-epoxyalkane and hydrogen sulphide are reacted simultaneously with an aqueous solution of an alkali-metal or alkaline-earth metal polysulphide, the proportion of H₂S being at least approximately one mol per mol of polysulphide, whereas the proportion of halo-epoxy-alkane does not exceed the stoichiometric ratio of the halogen to the metal of the polysulphide.

The best proportions for the reagents are:

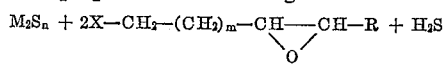

$M_2$, which represents two monovalent cations, can of course be replaced by a single bivalent cation, such as Ca or Ba. The mean number $n$ must be greater than 1 and can vary in value, for instance, up to 8, but is preferably from 1 to 3 and best of all near 2. The halogen X can be any of the 4 halogen I, Br, Cl, F but for cost reasons the emphasis in this description will be on chlorine. The number $m$ denoting the length of the hydrocarbon chain leading to the epoxy group of the halogenated side can vary widely with the nature of the hydrocarbon from which the epoxy derives but is, as a rule, from 0 to 17 and most commonly from 0 to 3, these values corresponding to the oxides of the propenes, butenes, pentenes and hexenes when R denotes a hydrogen atom. The radical R can be H or any aliphatic group; as a rule, its number of carbon atoms is 16 or less and, most usually, from 0 to 3.

Although the process according to the invention is of use with oxides of olefines in which the bonds with oxygen are in positions other than alpha-beta, this latter epoxy position is the most common in industrial products. Nor need the epoxy group be at the end of a chain; R can, as seen previously, denote, for instance, an alkyl group. However, in the cases which arise most frequently in industry, R is a hydrogen and the epoxy has an end position in the molecule.

Similarly, the position of the or each halogen in the aliphatic chain of the epoxide is not limited to the alpha position relatively to the oxygen-bearing carbon, although the latter position is the commonest.

Among the halo-epoxy-alkanes which are in practice most accessible for the purposes of the invention there are: 1-chloro (or 2,3 or/and 4)-5,6-epoxy-hexane; 1-chloro (or 2 or/and 3)-4,5-epoxy-pentane; 1-chloro,3,4-epoxy-butane; 2-bromo-3,4-epoxy-butane; 1-chloro-2,4-epoxy-butane; 1-chloro-2,3-epoxy-propane. The latter product, known under the name of epichlorohydrin, is a very common chemical product and economically available in large quantities; and so most of the condensation products used in the preparation of this invention were prepared from it.

As well as appropriate proportions of H₂S and halo-epoxy-alkane, another important factor for the invention is the condensation temperature. Preferably, condensation is performed above 50° C., at best at from 60 to 100° C., as compared with the usually ambient temperature used in the known processes. Below 50° C. it is found that the products evolved are insoluble in molten sulphur or else contain a rather large insoluble fraction.

The concentration of the solution in alkali-metal or alkaline earth metal polysulphide when treated with H₂S and halo-epoxy-alkane is preferably high but can vary considerably, inter alia from 1 to 7 mols of polysulphide, depending upon its solubility, per litre of dissolving water. Very good results are obtained with concentrations of the order of from 3 to 4 mols per litre of water.

As is generally known, the condensation reaction performed in the conditions according to the invention proceeds more rapidly in proportion as the temperature is higher. The reaction is substantially finished after approximately ½ hour when working at 100° C. and after approximately 4 hours when working at 50° C. It can be stated, but non-limitatively, that condensation can well be left to continue for 3 hours at 60° C., whereas, as a rule, about an hour is required at 85° C.

In one preferred and very advantageous form of the invention, a relatively concentrated polysulphide solution is first prepared by the dissolution of sulphur and simultaneous absorption of H₂S in an aqueous basis solution e.g. NaOH or KOH; the proportions of reagents are calculated to lead to a polysulphide having the composition $M_2S_n$, $n$ being from 1.5 to 3. The solution thereof is then heated to a temperature of from 60 to 90° C. and 2 mol of epichlorohydrin per mol of $M_2S_n$ are injected. The reaction mixture is kept hot for 3 hours (at 60° C.) or 1 hour (at 90° C.), depending upon the temperature, H₂S continuing to be injected in a proportion such that the overall composition comes as near as possible to:

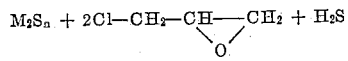

The condensation product which forms and which separates from the aqueous phase is washed in water.

When condensation is performed as just described, the novel resinous products obtained have molecular weights of from 500 to 3,000, preferably from 650 to 2,500; they are liquid or pasty at ambient temperature and completely liquid at 100° C. They are generally soluble in dioxane, tetrahydrofuran and dimethyl-formamide. A distinctive property of these novel products is their solubility is a proportion of at least 15% in liquid sulphur at above 150° C. without impairment, without precipitation or hardening of the solution during prolonged heating e.g. of 1 hour at 150° C.

Probably, the constitution of these products can be represented by the overall formula:

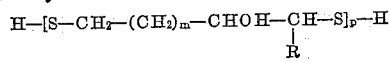

in which $m$ and R have the meanings previously given and $p$ has a mean value of from 4 to 24. The invention is not limited by this hypothetical formula.

The condensation products according to the invention, when prepared from chloro-1-epoxy-2,3-propane and from an alkaline polysulphide $M_2S_n$, the number $n$ being from 1.5 to 3, contain from 40 to 55% by weight of sulphur, more especially from 43 to 53%. Their SH contents are generally from 3 to 15%, depending upon the molecular weight of the product. Apparently, they correspond to the overall formula $H-(S-CH_2-CHOH-CH_2-S)_p-H$ in which the mean value of $p$ is from 4 to 24.

The object of the following non-limitative examples is to explain the invention. There are statements about products which are "soluble" in sulphur, with comparisons at some places with "insoluble" products. The definition of this solubility will now be given under the title of "Solubility Test."

SOLUBILITY TEST

A standard test performed as follows was used as criterion of the solubility of a condensation product in sulphur for the work described herein:

15 g. of the product to be tested are mixed with 85 g. of sulphur in a glass vessel, whereafter the mixture is heated with agitation at 150° C. for 1 hour. If the product dissolves completely without residue and without causing any setting or precipitation in the solution, and if the same when poured gives a homogeneous film after cooling, the product is considered to be "soluble in sulphur." Otherwise it is "insoluble."

Example 1

Preparation is effected in a reactor having a stirrer, a gas injection tube, a thermometer pocket, cooling means (cooling bath) and an exit for gas with refrigerant.

14 kg. of water and 4 kg. of sodium hydroxide are introduced consecutively. The mixture is agitated to dissolve the sodium hydroxide; 1.6 kg. of sulphur powder are added and H₂S is injected under stirring until 1.7 kg. have been absorbed. The result is a sodium polysulphide solution in which the mean value of $n$ is 2. 9.25 kg. of 1-chloro-2,3-epoxy-propane are then injected at 85° C., while the injection of H₂S is continued; the injection is effected with cooling and lasts for approximately 1 hour.

The mixture is then heated to 85° C. for 1 hour with agitation, with an excess of H₂S. 1.7 kg. thereof are fixed, giving a total of 3.4 kg. After pouring and removal of the top aqueous layer, the mixture is washed with cold water (at 20° C.) three times, being agitated each time with 10 litres of water to remove sodium chloride. The resulting soft resin which is impregnated with water in dehydrated by heating to 110° C. in a cylindrical vessel having an agitator and a thermometer. 9 kg. of a viscous greenish-yellow liquid are obtained with the following characteristics:

Percent S _____ 50.2
Percent SH _____ 12
Ashes, percent _____ 0.2
Mean molecular weight (according to SH) _____ 660

This resin is soluble in dioxane, tetrahydrofuran and dimethyl formamide.

The residual sodium chloride can be completely removed by filtration of solutions of the resin.

Example 2

A number of preparations at various temperatures were made by the procedure outlined in Example 1, the resinous condensation product which was obtained being weighed in each case. The table given hereinafter sums up the experiments; it indicates temperatures, condensation times at each temperature and the weights of resin obtained, and the last column entitled "sulphur test" gives the result of the standard solubility test hereinbefore described.

| T., ° C. | Time, hours | Resin obtained | Sulphur test |
| --- | --- | --- | --- |
| 40 | 3 | 8.4 | Precipitation of resin. |
| 50 | 3 | 8.6 | Some precipitation of resin. |
| 60 | 1 | 8.1 | Soluble. |
| 60 | 3 | 9.0 | Do. |
| 70 | 1 | 8.4 | Do. |
| 70 | 3 | 8.7 | Do. |

As will be apparent, condensation products which are completely soluble in sulphur are obtained at temperatures above 50° C.

Example 3

In condensation tests similar to those of Example 1, at 85° C. for 1 hour, the quantity of H₂S introduced during condensation simultaneously with epichlorohydrin was varied. The following was then found:

| Kg. H₂S | Mol H₂S/mol Na₂S₂ | Resin obtained, kg. | Sulphur test |
| --- | --- | --- | --- |
| 1.0 | 0.59 | 8.3 | Partly insoluble. |
| 1.7 | 1 | 9 | Soluble. |
| 2.5 | 1.47 | 9.1 | Do. |
| 3.0 | 1.77 | 9.1 | Do. |

Example 4

Working as in Example 1 and at 85° C. for 1 hour, with 1.7 kg. of H₂S introduced during condensation, the quantities of epichlorohydrin used were varied from the 9.25 kg. corresponding theoretically to the sodium of the polysulphide treated. These experiments have the following results:

| Kg. epichlorohydrin | Mol epichl./mol Na₂S₂ | Resin obtained, kg. | Sulphur test |
| --- | --- | --- | --- |
| 10.0 | 2.17 | 10 | Set. |
| 9.25 | 2 | 9 | Soluble. |
| 9.0 | 1.94 | 8.8 | Do. |
| 8.0 | 1.73 | 8 | Do. |

The stoichiometric proportion of epichlorohydrin is therefore the maximum proportion of epichlorohydrin which can be used, to obtain a resin soluble in sulphur without setting.

Example 5

The conditions of Example 1 being modified so that the reaction temperature is 95° C., the result after 1 hour is:

Resin, kg. _____ 8.2
Percent S _____ 48.2
Percent SH _____ 10.3

Example 6

The starting material used is a polysulphide in which the mean number $n$ is 1.5. It is prepared in the same conditions as in Example 1, but with 0.8 kg. of sulphur and 2.5 kg. of $H_2S$.

The reaction temperature is 85° C. One hour after the injection of epichlorohydrin there is obtained a weight of resin of 8.5 kg. and the resin shows the following characteristics:

Percent S _____ 46
Percent SH _____ 16

The product obtained is soluble in sulphur and forms a plastic film.

Example 7

In the same conditions and with the same apparatus as in Example 1, 3.2 kg. of sulphur and 1.7 kg. of $H_2S$ are reacted with 4 kg. of sodium hydroxide dissolved in 14 kg. of water. The result is a sodium polysulphide solution in which the mean value of $n$ is 3. This is reacted at 85° C. with 9.25 kg. of epichlorohydrin and an excess of $H_2S$. The resulting mixture is left at 85° C. for 1 hour, then washed, with kneading, in cold water until the washing water is neutral. Resin in a weight of 10.5 kg. is then collected and has the following characteristics:

Percent S _____ 53
Percent SH _____ 3
Mean molecular weight (according to the percent of SH) _____ 2500 the resin is soluble in sulphur.

Example 8

In a procedure similar to that of Example 1, the 9.25 kg. of 1-chloro-2,3-epoxy-propane are replaced by 10.65 kg. (10 moles) of 1-chloro-3,4-epoxy-butane. There are obtained 9.9 kg. of a resin similar to that of Example 1, the sulphur content therein being 47.1% by weight.

Example 9

In 1.5 litres of an aqueous solution of 3.7 moles per litre of potassium polysulphide the average formula of which was $K_2S_{1.88}$, hydrogen sulphide is injected at ambient temperature. When 4 moles $H_2S$ were thus absorbed per litre of the solution, 15.1 kg. of 1-bromo-3,4-epoxy butane (10 moles) were introduced into the solution while injecting $H_2S$ was continued, temperature having been raised to 68° C. The reaction medium was kept at that temperature, under continuously stirring, for 2½ hours, $H_2S$ being still passed therethrough during this time. After decantation and washing as in Example 1 a similar resin was obtained the ponderal sulphur content of which was 43%.

Example 10

In the same procedure as in Example 9, 5.55 moles of calcium polysulphide having the average formula $CaS_{2.46}$ were used instead of potassium polysulphide, and the halo-epoxy-alkane used was 2-chloro-3,4-epoxy-hexane in the amount of 12 kg. (9.95 moles). The resin obtained had 42.2% sulphur by weight.

I claim:
1. A process for the preparation of resinous condensation products soluble in molten sulphur, which comprises reacting a halo-epoxy alkane having from 3 to 17 carbon atoms and hydrogen sulphide simultaneously with an aqueous solution of an alkali metal or alkaline earth metal polysulphide at temperatures of from 50° to 100° C. and in the proportions of at least one mole of the hydrogen sulphide per mole of the polysulphide reactant.

2. The process as defined in claim 1, wherein said halo-epoxy alkane has the formula

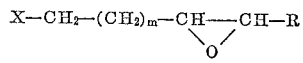

in which X is chlorine or bromine, $m$ is a number from 0 to 3, and R is hydrogen or an aliphatic group having from 0 to 3 carbon atoms.

3. The process as defined in claim 1, in which the amount of said halo-epoxy alkane reacted does not exceed that proportion corresponding to the stoichiometric ratio of its component halogen to the cation of said polysulphide reactant.

4. The process as defined in claim 1, wherein the polysulphide reactant has the formula

in which $M_2$ represents two alkali metal cations or a single alkaline earth metal cation, and $n$ is a number from 1 to 3.

5. The process as defined in claim 1, wherein said halo-epoxy alkane reactant is 1-, 2-, 3-, or 4-chloro-5,6-epoxy-hexane; 1-, 2-, or 3-chloro-4,5 - epoxy - pentane; 1-chloro-3,4-epoxy-butane; 2-bromo-3,4-epoxy-butane; 1-chloro-2,4-epoxy-butane; or 1-chloro-2,3-epoxy-propane.

6. The process as defined in claim 1, in which the halo-epoxy alkane reactant is 1-chloro-2,3-epoxy-propane and the polysulphide reactant is $Na_2S_n$, wherein $n$ is a number from 1 to 3.

7. A resinous product having the formula

in which $p$ is a number the mean value of which is from 4 to 24, said product having a molecular weight of from 500 to 3000, being soluble in molten sulphur in a proportion of at least 15% by weight at a temperature of about 150° C., melting below 100° C. and having a sulphur content of 40% to 55% by weight.

References Cited

UNITED STATES PATENTS 2,469,404   5/1949   Patrick _____ 260—79.1

FOREIGN PATENTS 667,431   3/1930   France.
966,389   10/1950   France.
661,362   11/1951   Great Britain.

DONALD E. CZAJA, *Primary Examiner.*

M. I. MARQUIS, *Assistant Examiner.*